Patented Feb. 16, 1937

2,071,103

UNITED STATES PATENT OFFICE 2,071,103

DRY ELECTROLYTIC CONDENSER

Milton Bergstein, New York, N. Y., assignor to Micamold Radio Corporation, Brooklyn, N. Y., a corporation of New York No Drawing. Application May 18, 1931, Serial No. 538,400

4 Claims. (Cl. 175—315)

The invention relates particularly to electrolytes employed in condensers of the dry electrolytic type. In so far as I am aware electrolytes heretofore used by others for the above purpose have depended essentially upon the presence of water in some proportion as the ionizing solvent, and an important feature of such condensers has been that they be so compounded as to tend to retain whatever water be present in spite of its high vapor tension, and this has been effected by the addition of such hygroscopic materials as glycerol and glycol.

I have discovered that it is possible to employ an electrolyte in which no water is introduced in any form and that a solvent of much higher boiling point than water may be employed, so that its vapor tension at ordinary temperatures will be low, and it becomes unnecessary to use substances such as glycol or glycerol to retain the solvent in the condenser.

In particular I have found that it is possible to use as my ionizing solvent a substituted ammonium compound such as triethanolamine which in itself has low basicity and low solvent effect upon the aluminum oxide dielectric of condensers of the above type. For example, my electrolyte may be formed by mixing 27 parts of triethanolamine with 42 parts of boric acid, the electrolyte being quite thin and liquid when hot, but quite stiff when cool. The electrolyte may be applied to a gauze or other suitable separator interposed between the armatures of condensers of either the flat or rolled type, as is known in the art.

Another suitable electrolyte may be formed by melting 26 parts of triethanolamine with 48 parts of boric acid and 13 parts sucrose, this composition being somewhat more viscous when cool than the composition first above described. The sucrose increases the acidity of the boric acid and therefore the conductivity of the electrolyte is increased, boric acid of itself being very weak but when compounds are present such as sugars, glycol or glycerol which contain hydroxyl groups on adjacent carbon atoms orientated in the same direction, a reaction takes place which yields an acid of greater strength. The reaction with sucrose is as follows:

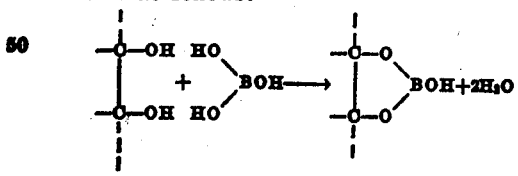

It may be noted that water results as a product of the last mentioned reaction but as above stated neither the presence of water nor the addition of sucrose is essential to the operativeness of the condenser, although water containing or sucrose constituents will have no harmful effects unless the electrolyte be thereby made too thin. Neither are the particular proportions of material above mentioned essential, since I have found that a small concentration of triethanolamine will yield an electrolyte which is quite stiff when cool.

I have also found that citric acid may be employed in conjunction with triethanolamine, for example, in the proportion of 61 parts acid to 23 parts amine, the citric acid containing a certain amount of water of hydration. I have also compounded citric acid in various proportions with boric acid-triethanolamine mixtures, and in such cases the results also have been satisfactory.

A particular value of all of the above compositions lies in the triethanolamine which is a weakly basic ionizing solvent and which reacts with acids to form triethanolammonium salts, compounds which are satisfactory for condenser electrolytes. Furthermore other substituted amines, particularly the other alcohol substituted amines of suitable high boiling point will prove satisfactory for the above purposes in varying degrees. The present invention comprehends generally that class of solvents which will react with an acid to yield salts of radicals less electro-positive than the metals of the alkali group.

I claim:

1. An electrolytic condenser of the class described having an armature of the film-forming type and an electrolyte combining boric acid and a compound containing similarly orientated hydroxyl groups on adjacent carbon atoms with triethanolamine.

2. An electrolytic condenser of the class described having an armature of the film-forming type and an electrolyte combining boric acid, sucrose and triethanolamine.

3. An electrolyte combining boric acid, a sugar and an alcohol substituted amine.

4. An electrolyte combining boric acid, sucrose and triethanolamine.

MILTON BERGSTEIN.